(12) United States Patent
Votolato

(10) Patent No.: US 9,691,304 B2
(45) Date of Patent: Jun. 27, 2017

(54) ITEM HANGING AND MANIPULATING APPARATUS

(71) Applicant: Earl Votolato, Newport Beach, CA (US)

(72) Inventor: Earl Votolato, Newport Beach, CA (US)

(*) Notice: Subject to any disclaimer, the term of this patent is extended or adjusted under 35 U.S.C. 154(b) by 0 days.

(21) Appl. No.: 15/144,663

(22) Filed: May 2, 2016

(65) Prior Publication Data
US 2017/0053569 A1    Feb. 23, 2017

Related U.S. Application Data

(60) Provisional application No. 62/206,183, filed on Aug. 17, 2015.

(51) Int. Cl.
| | |
|---|---|
| *F16M 11/02* | (2006.01) |
| *G09F 7/20* | (2006.01) |
| *G09F 27/00* | (2006.01) |
| *F16M 11/04* | (2006.01) |
| *F16M 11/18* | (2006.01) |
| *F16M 13/02* | (2006.01) |
| *G09F 7/18* | (2006.01) |

(52) U.S. Cl.
CPC ............ *G09F 7/20* (2013.01); *F16M 11/046* (2013.01); *F16M 11/18* (2013.01); *F16M 13/027* (2013.01); *G09F 27/00* (2013.01); *G09F 2007/186* (2013.01); *G09F 2007/1839* (2013.01)

(58) Field of Classification Search
CPC ............ G09F 7/20; G09F 2007/1839; G09F 2007/186; F16M 13/022
USPC .... 248/320, 323, 327, 328, 329, 330.1, 343; 40/601, 617
See application file for complete search history.

(56) References Cited

U.S. PATENT DOCUMENTS

| | | | | |
|---|---|---|---|---|
| 2,702,176 | A * | 2/1955 | Dulle .................... | A47F 5/0892 248/323 |
| 3,609,898 | A * | 10/1971 | Brown ................ | G09F 15/0087 40/601 |
| 4,434,570 | A * | 3/1984 | Roos ......................... | G09F 7/20 40/617 |
| 4,887,660 | A * | 12/1989 | Kraus ....................... | E06B 9/60 160/265 |
| 5,529,274 | A | 6/1996 | Anderson et al. | |
| 5,870,845 | A * | 2/1999 | Ruderman ................ | G09F 7/18 160/339 |
| 5,979,671 | A * | 11/1999 | Pan ........................ | D06F 57/125 211/1.57 |
| 6,055,754 | A | 5/2000 | Melhuus | |
| 6,327,803 | B1 | 12/2001 | Ruderman | |
| 6,464,190 | B1 * | 10/2002 | Aramaki ................. | F21V 21/38 248/327 |

(Continued)

*Primary Examiner* — Muhammad Ijaz
(74) *Attorney, Agent, or Firm* — Edwin P. Tarver; Lauson & Tarver LLP

(57) ABSTRACT

An apparatus for hanging and manipulating items that are suspended from a ceiling or wall. The apparatus includes hanging structures to suspend items from a wall or ceiling, a remotely controlled motorized take up reel system to raise and lower the items by way of suspension lines so the items can either be positioned, replaced, repaired or displayed, and a leveling system. The system can be safely operated without a person having to move a ladder in place and go up the ladder to work with the suspension item.

20 Claims, 3 Drawing Sheets

(56) References Cited

U.S. PATENT DOCUMENTS

| | | |
|---|---|---|
| 6,557,285 B2 | 5/2003 | Walsh, Jr. |
| 6,591,528 B2 | 7/2003 | Ellingsen |
| 6,634,610 B1 | 10/2003 | Ricci et al. |
| 6,701,650 B1 | 3/2004 | Cieciuch et al. |
| 6,775,936 B2 | 8/2004 | Padiak et al. |
| 7,121,029 B2 | 10/2006 | Wilson |
| 7,234,685 B2 | 6/2007 | Britten |
| 7,249,743 B1 * | 7/2007 | Stearns ................ A47F 5/0892 248/329 |
| 8,033,529 B2 | 10/2011 | Boda et al. |
| 8,418,980 B2 | 4/2013 | Wakura |
| 2003/0051410 A1 | 3/2003 | Cloutier |
| 2004/0031898 A1 | 2/2004 | Mijatovic |
| 2005/0188571 A1 * | 9/2005 | Wilson ................ G09F 17/00 40/601 |
| 2006/0196091 A1 | 9/2006 | Ricci et al. |
| 2007/0037667 A1 * | 2/2007 | Gordon ............. A63B 22/0017 482/51 |
| 2011/0247174 A1 * | 10/2011 | Keishold ................ A47H 1/02 16/87.4 R |
| 2012/0241579 A1 | 9/2012 | Karlsson et al. |
| 2013/0126809 A1 | 5/2013 | Britten et al. |
| 2013/0291415 A1 * | 11/2013 | Stein ................... A47G 1/1686 40/601 |
| 2014/0252285 A1 * | 9/2014 | Genoe ................... B66C 23/44 254/280 |
| 2015/0028172 A1 * | 1/2015 | Israeli ................ F16M 11/046 248/205.1 |

* cited by examiner

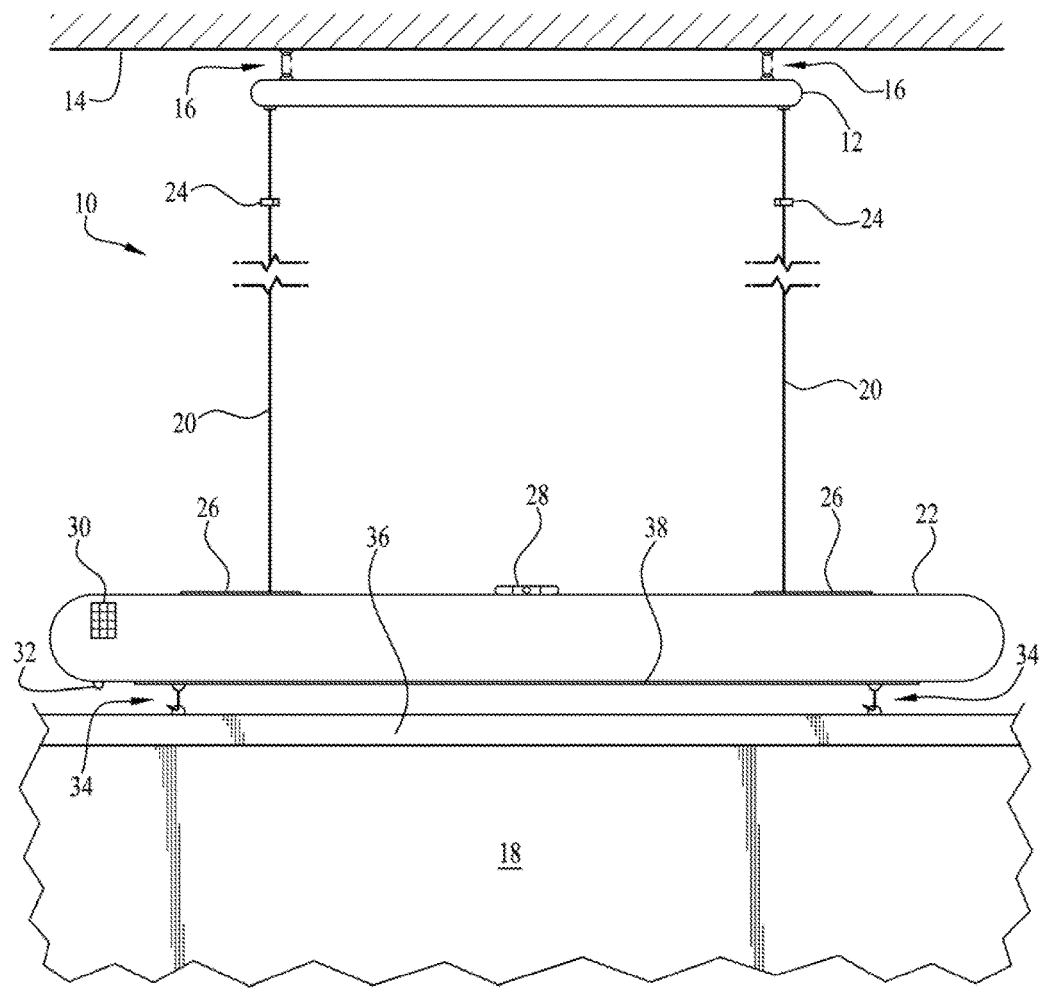
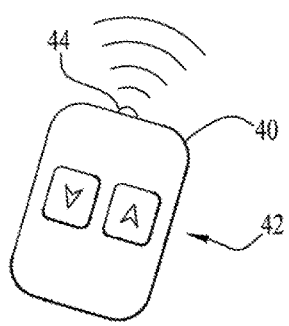
fig.1

ITEM HANGING AND MANIPULATING APPARATUS

This application claims the benefit of the priority filing date of provisional application No. 62/206,183 filed Aug. 17, 2015.

BACKGROUND

Commercial, industrial and residential spaces, such as malls, warehouse stores and other locations, typically have high ceilings from which promotional and similar display items frequently need to be displayed. These display items may consist of marketing materials such as merchandising displays, posters, placards and three-dimensional or two-dimensional point of purchase display items. Occasionally, actual merchandise may be suspended for view and promotion. For example, tools in home improvement stores are frequently suspended for display. In some work environments there is a need to hang tools above work spaces and assembly areas to make room for work activities. To remove and reinstall these items, when replacing or stowing and storing a tool or display, employees must scale a ladder or other similar apparatus to take down the displayed item.

A common method of removing and reinstalling display items is for an employee to climb up to the height of the item near the ceiling and manipulate it by hand. During this process, employees must frequently climb to a height of twelve feet or more, lean out of balance, and make multiple trips up and down depending on the number of items. Common climbing apparatus, such as A-frame ladders and the like, being generally narrow, are particularly ill suited for supporting persons at a great height due to their tendency to tip over. Because businesses frequently need to change multiple individual signs, there is a risk an employee will fall and cause injury at great expense to the employer.

Furthermore, using a ladder (or similar support) necessarily incurs additional expenses including purchasing costs, providing a secure storage location when not in use, and paying for added employee time to retrieve the ladder and put it away every time a display item needs to be changed. To the extent the ladder is frequently used, these expenses are compounded by the ongoing risk an employee will accidentally fall and cause injury as well as the possibility and danger of injury associated with using these ladders/devices around customers in the area under a display.

Certain apparatus and methods have been developed in the art for removing and replacing signage and similar items suspended from a substantial height. Predominantly, these involve employees manipulating a long pole or telescoping tool while standing on the ground. While they avoid the risk of falling, these technologies are disfavored. Long poles tend to flex along their length, and small movements by the employee grasping one end of a pole translates into large movements at the other end, making it unwieldy and difficult and dangerous to handle.

The difficulty in handling and manipulating pole-type apparatus also risks damage to lighting, ceiling structures, tiles and at times the employee losing control of the pole and the pole striking a customer in the vicinity of the employee. The weight of these apparatus can also be problematic when hanging, raising, and lowering items and/or displays. Like ladders, poles need to be stored, then retrieved and put away again in order to change displayed items.

For the above reasons, there is an need for an apparatus allowing easy display, adjusting and removal of displayed items hanging from a ceiling or from any substantial height. There is also need to eliminate the requirement for additional equipment such as ladders or poles, and the time, expense, and dangers inherent in operating them. Additionally, there is a need for a self contained apparatus that conveniently stows away when not in use.

SUMMARY

An apparatus for hanging and manipulating a display item from a ceiling includes a ceiling tube having a tension pulley with a line passing through the ceiling tube and engaging the tension pulley. A housing having a motor driven take up reel is coupled to the line. The housing includes a first hanging structure for suspending the display item. The motor driven take up reel lowers or raises the housing relative to the ceiling tube when the motor driven take up reel is rotated, and the tension pulley resiliently holds the line as the motor driven take up reel rotates.

The ceiling tube includes a second hanging structure for suspending the ceiling tube from the ceiling, and a releasable clip on the line between the ceiling tube and the housing prevents the line from entering the housing. The housing also includes a battery-powered motor for rotating the motor driven take up reel. The housing has a first slot for allowing the line to move along the motor driven take up reel (48) as the motor driven take up reel rotates.

The housing includes a second slot allowing the hanging structure to move lengthwise along the housing. A level indicator may be included on the housing, and a plurality of tension pulleys may be located inside the ceiling tube. In one embodiment, the motor driven take up reel may be mounted on a rod inside the housing, the rod supported by a bushing inside the housing. Preferably the apparatus includes a remote control for controlling the motor driven take up reel. In one alternative embodiment, the housing may be automatically leveled by an electro-mechanical or mechanical self-leveling system controlled by sensors, electronic circuitry, pulleys and/or the motor.

In an alternative embodiment the apparatus may include a ceiling tube for anchoring to a ceiling, the ceiling tube including a tension pulley. A housing is coupled to the ceiling tube by a line, the housing having a plurality of motor driven take up reels engaging the line. The plurality of motor driven take up reels lowers or raises the housing relative to the ceiling tube when the plurality of motor driven take up reels is rotated, and the line passes through the ceiling tube and engages the tension pulley such that the tension pulley holds the line within the ceiling tube as the plurality of motor driven take up reels rotates.

The ceiling tube may also include a hanging structure for suspending the ceiling tube from the ceiling. A releasable clip may be included on the line between the ceiling tube and the housing, the releasable clip preventing the line from entering the ceiling tube and the housing. The housing preferably includes a battery-powered motor for rotating the motor driven take up reels, and a first slot allowing the line to move along the motor driven take up reels as the motor driven take up reels rotate. The housing also preferably includes a second slot allowing the hanging structure to move lengthwise along the housing. As with the first embodiment, the apparatus preferably includes a level indicator on the housing (and/or an automatic self-leveling system within the housing and/or ceiling tube), and may have a plurality of tension pulleys inside the ceiling tube.

BRIEF DESCRIPTION OF THE FIGURES

FIG. 1 illustrates a front view of an item hanging and manipulating apparatus;

DESCRIPTION

Figure 2:
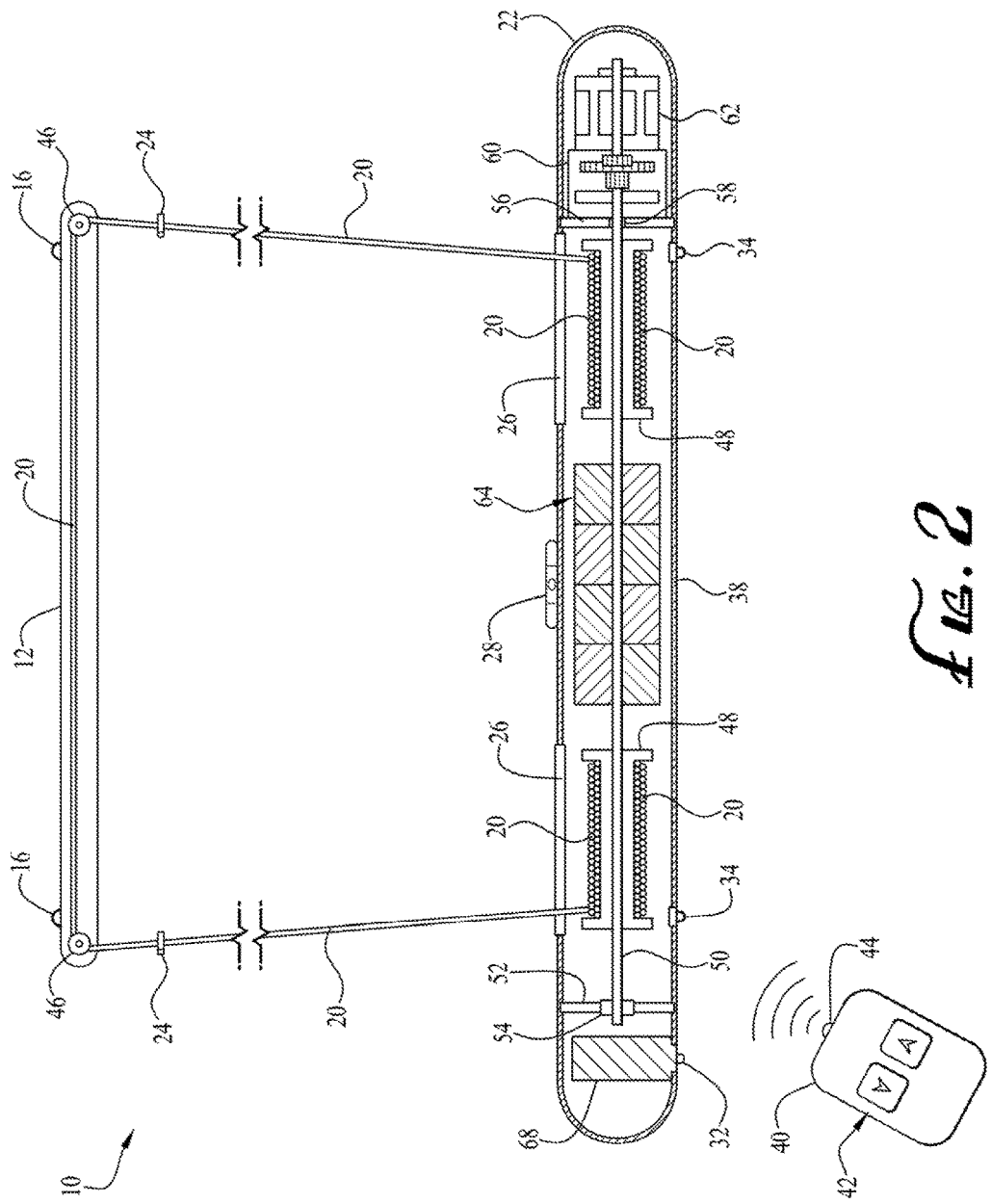
FIG. 2 illustrates a front section view of the item hanging and manipulating apparatus.

Referring to FIG. 1, an item hanging and manipulating apparatus 10 comprises a ceiling tube 12 and a housing 22. The ceiling tube 12 is installed on or near a ceiling 14. For this purpose, the ceiling tube 12 may include first hanging structures 16 (such as loops, hooks, clips, adhesive, magnets, etc.) for coupling it to the ceiling 14, or any similar means used to suspend a display item 18 (such as a poster, placard, or other object) from the ceiling 14. In one embodiment, the ceiling tube 12 may be substantially nine to twelve inches in length, although any preferred length is contemplated.

A line 20 passes through the ceiling tube 12, coupling the ceiling tube 12 to the housing 22. The housing 22 is preferably electro-mechanical, raising and lowering itself on the line 20 relative to the ceiling tube 12 under its own power. Clips 24, such as pinch clips for example, are placed on the line 20 to set the maximum desired return height of the housing 22 (i.e., its closest proximity to the ceiling tube 12). The housing 22 includes first slots 26 that allow the line 20 to reel in and out of the housing 22. A leveling system 28, such as a bubble level indicator for example, allows a user to level the housing 22. In other embodiments, the housing 22 may be automatically leveled by an electro-mechanical or mechanical self-leveling system 28 controlled by sensors, electronic circuitry such as a circuit chip 68 (FIG. 2), pulleys and/or a motor 62 (FIG. 2). Leveling may be accomplished by having the leveling system 28 on the ceiling tube 12. An on-board photovoltaic cell 30 may be included for charging batteries 64 (FIG. 2) and/or powering components of the apparatus 10, and a first power indicator 32, such as an LED for example, indicates when power is low. In one embodiment, the housing 22 may be sixteen inches in length, although any preferred length is contemplated.

The housing 22 also includes second hanging structures 34 for connecting to a display bar 36 for suspending a planar display item 18 such as a poster or similar display prone to undesirable bending. Optionally, the second hanging structures 34 may connect directly to the display item 18 without the display bar 36. Like the first hanging structures 16, the second hanging structures 34 may include loops, hooks, clips, adhesive, magnets, etc., or any similar means used to suspend a display item 18. In order to accommodate differently sized display items 18, the housing 22 preferably includes a second slot 38 along which the second hanging structures 34 travel in linear arrangement, allowing users to slide them closer together or farther apart. Also preferably, the second hanging structures 34 may be biased to retain a chosen position along the second slot 38 unless moved by a user.

The apparatus 10 may include arrow indicators for raising and lowering the housing 22 and an on/off switch. A remote control 40 is preferably included with arrow indicator buttons 42 and a power on/off functionality to promote ease of use, and a second power indicator 44, such as an LED for example, that indicates when the apparatus 10 is low on power. The remote control 40 can be used to lower the housing 22, attach a display item 18 (or a combination of the display item 18 and the display bar 36) to the housing 22, and raise the housing 22 and display item 18 to a preferred height without having to leave the ground.

Referring to FIG. 2, the ceiling tube 12 includes tension pulleys 46 to allow horizontal adjustment of the housing 22, by simply manipulating the housing 22 to a desired position, which will cause the line 20 to travel through the ceiling tube 12 as needed. The tension pulleys 46 will retain the position of the line 20 (and therefore the position of the housing 22) in the preferred position until the housing 22 is once again adjusted by a user. The clips 24 coupled to the line 20 govern the amount of adjustment that can be made when manipulating the housing 22 (i.e., lowering or raising the clips 24 on the line 20, respectively increases or decreases adjustability).

Still referring to FIG. 2, the housing 22 takes in or releases the line 20 to raise or lower the housing 22 relative to the ceiling tube 12. Excess line 20 is preferably stored on one or more take-up reels 48 installed just below the first slots 26 through which the line 20 travels. The take-up reels 48 preferably move in tandem on a rod 50 substantially spanning the housing 22. The rod 50 may be supported by a first support 52 having a first bushing 54 and a second support 56 with a second bushing 58, which allow the rod 50 to rotate. In the illustrated embodiment, the take up reels 48 are disposed between the first support 52 and second support 56, although other rod 50 supporting arrangements are possible according to preference.

The rod 50 is coupled to a gear box 60 and a motor 62 that govern the rotational direction and speed of the rod 50. Power to the motor 62 is supplied by a series of on-board rechargeable batteries 64 that may derive power from the photovoltaic cell 30 (not shown). In alternative embodiments, a wired power source (not shown) for charging the batteries 64 quickly or powering the apparatus 10 in dim environments, may be included. In another alternative embodiment, a regenerative system (not shown) may be coupled to the motor 62, to harvest power from rotational movement of the rod 50 as the housing 22 descends under gravity.

Power distribution and motor 62 control is governed by a circuit chip 68. The circuit chip 68 is in communication with the photovoltaic cell 30, the first power indicator 32, the batteries 64 and the motor 62. The circuit chip 68 is also in preferably wireless communication with the remote control 40, and coordinates up and down movement of the housing 22 and activation of the second power indicator 44 on the remote control 40 when power is low.

Figure 3:
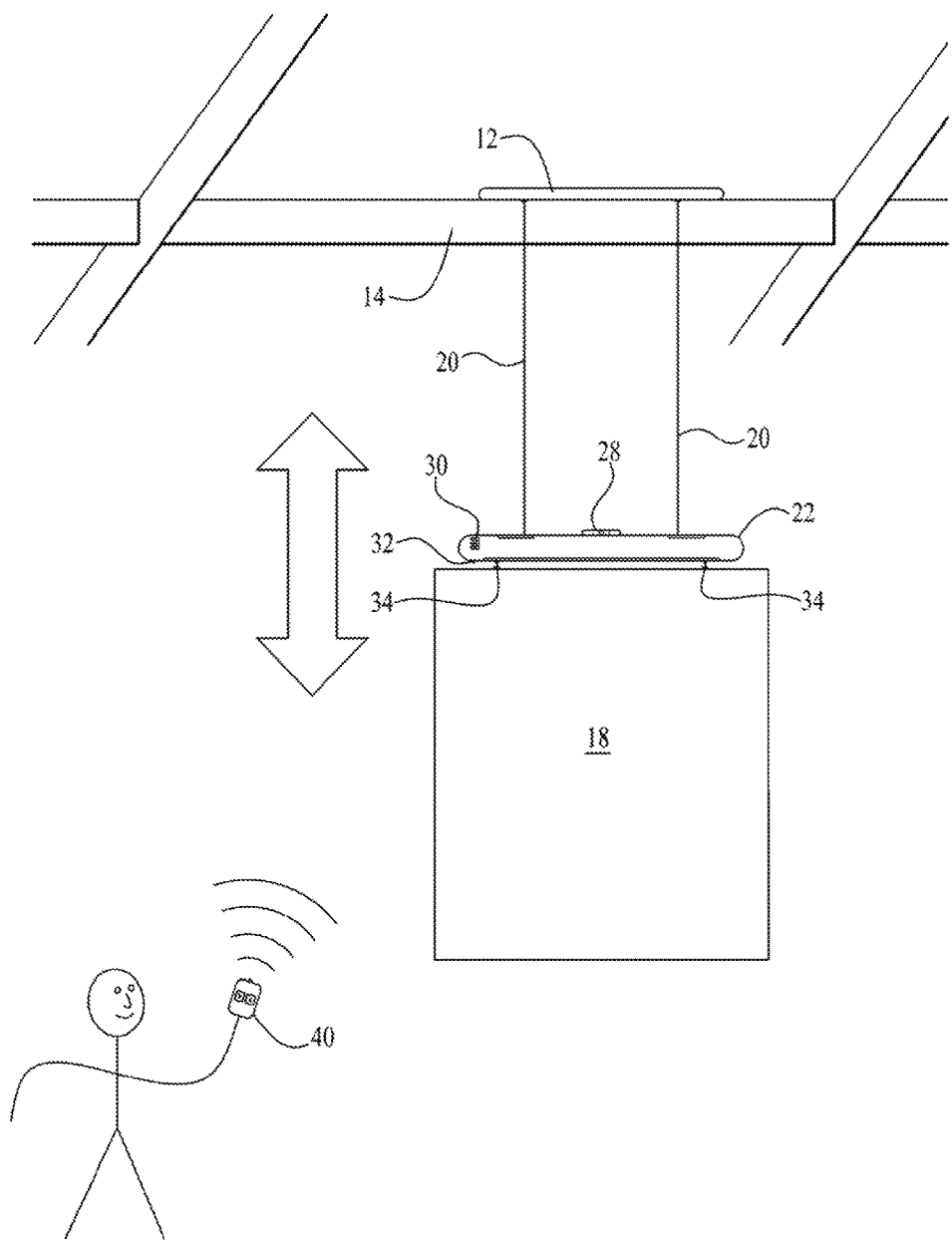
FIG. 3 illustrates the item hanging and manipulating apparatus installed on a ceiling and in use by a user.

Referring to FIG. 3, with the ceiling tube 12 installed adjacent a ceiling 14, the housing 22 is suspended by the line 20. By operating the remote control 40, the housing 22 may be raised or lowered according to preference. Since the display item 18 typically remains displayed for a prolonged period and in a well-lit environment during business hours, power continuously harvested by the photovoltaic cell 30 is sufficient to recharge the batteries 64 (not shown) and/or other components of the apparatus 10 after the brief power demands of raising and lowering the display item 18.

The item hanging and manipulating apparatus 10 having been described, its method of use will now be discussed.

In order to use the apparatus 10, a user initially identifies an area in a commercial location for a hanging display item 18, preferably in a well lit environment. For initial installation, the user affixes the ceiling tube 12 to the ceiling 14, using the first hanging structures 16 (e.g., loops, hooks, clips, adhesive, magnets, etc.) most suited to the particular location. Preferably, the apparatus 10 initially arrives with the line 20 completely reeled into the housing 22 to avoid tangling. Also, the apparatus 10 preferably arrives with the batteries 64 pre-charged.

Once the ceiling tube 12 is anchored in the desired location on the ceiling 14, the user operates the remote control 40, causing the circuit chip 68 to coordinate unreeling the line 20 and allowing the housing 22 to descend under gravity to a height approaching the user. With the housing 22 in a lowered position, the user obtains a display item 18, and couples the display item 18 to the second hanging structures 34. Alternatively, the display item 18 may be affixed to a display bar 36, and the display bar 36 coupled to the second hanging structures 34. In the process of attaching the display item 18, the second hanging structures 34 are preferably slid along the second slot 38 to an appropriate location, preferably one that balances the display item 18 under the housing 22.

Once the display item 18 is installed on the housing 22, a user may occasionally need to level the display item 18 and housing 22. The user may simply press down on the housing 22, which urges the line 20 through the tension pulleys 46 in the ceiling tube 12, allowing the housing 22 to tilt as needed. Using the level indicator 28, the user can manipulate the housing 22 to perfect level before raising the display item 18.

Once the display item 18 is level, the user operates the remote control 40, activating the motor 62, and causing the take-up reels 48 to take up the line 20, thereby raising the housing 22 and the display item 18 to a desired height. With the up and down indicator buttons 42 on the remote control 40, the user can easily adjust and change the housing 22 height according to preference. Once in a desired position, the display item 18 remains displayed, and environmental ambient light acts on the photovoltaic cell 30 to keep the batteries 64 charged for later use. Since the layout of commercial businesses rarely changes, climbing up to the ceiling 14 to change the display item's 18 location will likely be very infrequent.

Over time, the circuit chip 68 monitors the battery 64 power level and ensures proper charging from the photovoltaic cell 30. In the event battery 64 power drops below a predetermined level, or fails to recharge, the circuit chip 68 will sense the low power level and illuminate the first power indicator 32 on the housing 22 and the second power indicator 44 on the remote control 40. The second power indicator 44 will also illuminate if the remote control 40 batteries are low in power. This action is preferably calibrated to occur before power drops below a level sufficient for normal operation. A user alerted to the low power condition may then address the issue by raising the ambient light level, or if the problem persists, lowering the housing 22 for inspection and/or battery replacement or repair.

The foregoing description of the preferred embodiment is sufficient to enable one skilled in the art to make and use the preferred embodiment. It is understood, however, that the preferred embodiment is not intended to limit the scope of the invention, in as much as equivalents thereof and other modifications which come within the scope of the invention as defined by the claims will become apparent to those skilled in the art upon reading this specification.

What is claimed is:

1. An apparatus for hanging and manipulating a display item from a ceiling, the apparatus comprising:
   a ceiling tube having a tension pulley;
   a line passing through the ceiling tube, the line engaging the tension pulley;
   a housing having a motor and a take up reel coupled to the line;
      the housing having a first hanging structure for suspending the display item; wherein the take up reel lowers or raises the housing relative to the ceiling tube when the motor rotates the take up reel; and
   wherein the tension pulley is secured within the ceiling tube and resiliently holds at least a portion of the line within the ceiling tube for manipulating the display item as the take up reel rotates.

2. The apparatus of claim 1 wherein the ceiling tube comprises a second hanging structure for suspending the ceiling tube from the ceiling.

3. The apparatus of claim 1 further comprising a releasable clip on the line between the ceiling tube and the housing, the releasable clip preventing the line from entering the housing.

4. The apparatus of claim 1 wherein the housing further comprises a battery-powered motor for rotating the take up reel.

5. The apparatus of claim 1 wherein the housing has a first slot for allowing the line to move along the take up reel as the take up reel rotates.

6. The apparatus of claim 1 wherein the housing has a second slot allowing the hanging structure to move lengthwise along the housing.

7. The apparatus of claim 1 further comprising a leveling system, the leveling system chosen from electro-mechanical and mechanical leveling systems.

8. The apparatus of claim 1 having a plurality of tension pulleys inside the ceiling tube.

9. The apparatus of claim 1 wherein the take up reel is mounted on a rod inside the housing.

10. The apparatus of claim 9 wherein the rod is supported by a bushing inside the housing.

11. The apparatus of claim 1 further comprising a remote control for controlling the take up red.

12. The apparatus of claim 11 having a plurality of tension pulleys inside the ceiling tube.

13. An apparatus for hanging and manipulating a display item to a ceiling, the apparatus comprising:
   a ceiling tube for anchoring to the ceiling, the ceiling tube having
   a tension pulley; a housing coupled to the ceiling tube by a line, the housing having a motor and a plurality of take up reels coupled to the line;
   wherein the plurality of take up reels lowers or raises the housing relative to the ceiling tube when the plurality of take up reels are rotated by the motor; and
   wherein the tension pulley is secured within the ceiling tube and resiliently holds at least a portion of the line within the ceiling tube, wherein the line passes through the ceiling tube and engages the tension pulley as the plurality of take up reels rotate to for manipulating the display item.

14. The apparatus of claim 13 wherein the ceiling tube further comprises a hanging structure for suspending the ceiling tube from the ceiling.

15. The apparatus of claim 13 further comprising a releasable clip on the line between the ceiling tube and the housing, the releasable clip preventing the line from entering the ceiling tube and the housing.

16. The apparatus of claim 13 wherein the housing further comprises a battery-powered motor for rotating the plurality of take up reels.

17. The apparatus of claim 13 wherein the housing includes a first slot allowing the line to move along the plurality of take up reels as the plurality of take up reels rotate.

18. The apparatus of claim 13 wherein the housing includes a second slot allowing the hanging structure to move lengthwise along the housing.

19. The apparatus of claim 13 further comprising a leveling system, the leveling system chosen from electro-mechanical and mechanical leveling systems.

20. An apparatus for hanging and manipulating a display item, the apparatus comprising:
- a ceiling tube having a tension pulley;
- a line passing through the ceiling tube, the line engaging the tension pulley;
- a housing having a motor and a plurality of take up reels coupled to the line; the housing further including
- a level indicator and
- a hanging structure for suspending the display item;
- wherein rotating the plurality of take up reels raises or lowers the housing relative to the ceiling tube; and
- wherein the tension pulley is secured within the ceiling tube and resiliently secures at least a portion of the line within the ceiling tube for manipulating the display item.

* * * * *